US011308122B2

(12) United States Patent
Satoyama et al.

(10) Patent No.: US 11,308,122 B2
(45) Date of Patent: Apr. 19, 2022

(54) REMOTE COPY SYSTEM

(71) Applicant: HITACHI, LTD., Tokyo (JP)

(72) Inventors: Ai Satoyama, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 136 days.

(21) Appl. No.: 16/805,901

(22) Filed: Mar. 2, 2020

(65) Prior Publication Data

US 2021/0064638 A1 Mar. 4, 2021

(30) Foreign Application Priority Data

Aug. 27, 2019 (JP) .............................. JP2019-154963

(51) Int. Cl.
*G06F 16/00* (2019.01)
*G06F 16/27* (2019.01)
(52) U.S. Cl.
CPC .................. *G06F 16/273* (2019.01)
(58) Field of Classification Search
CPC .................................................... G06F 16/273
USPC ........................................................ 707/615
See application file for complete search history.

(56) References Cited

U.S. PATENT DOCUMENTS

| 2005/0033827 A1* | 2/2005 | Yamagami | G06F 16/10 709/219 |
| 2005/0172166 A1 | 8/2005 | Eguchi et al. | |
| 2008/0250079 A1 | 10/2008 | Eguchi et al. | |
| 2011/0078121 A1* | 3/2011 | Eguchi | G06F 11/1471 707/654 |
| 2018/0373429 A1* | 12/2018 | Yamamoto | G06F 11/1076 |

FOREIGN PATENT DOCUMENTS

JP 2005-222110 A 8/2005
WO 2017/145223 A1 8/2017

OTHER PUBLICATIONS

Japanese Office Action dated Apr. 27, 2021 for Japanese Patent Application No. 2019-154963.

* cited by examiner

*Primary Examiner* — Chelcie L Daye
(74) *Attorney, Agent, or Firm* — Volpe Koenig

(57) ABSTRACT

A first storage system of a remote copy system includes a data volume, a journal volume, and a storage controller. When an operation is received from a first server system, based on the operation, the storage controller executes any of a work of storing the update content by the operation in the journal volume or a work of executing the operation when the operation is received.

6 Claims, 11 Drawing Sheets

FIG. 7

| VOL ID 1001 | START LBA 1002 | NUMBER OF BLOCKS 1003 | SEQUENCE NUMBER 1004 | TIME 1005 | DATA 1006 | OPERATION 1007 |
|---|---|---|---|---|---|---|
| 10:00 | 100 | 4 | | 9:00:01 | | |
| 10:01 | | | | | | SNAPSHOT |
| ... | ... | ... | | | | |

| OPERATION TYPE | EXECUTOR | SECONDARY SITE REPRODUCTION METHOD |
|---|---|---|
| QoS | AP | METHOD 2 |
| QoS | STORAGE ADMINISTRATOR | METHOD 1 |
| I/O | AP | METHOD 2 |
|  |  |  |
| ... | ... | ... |

REMOTE COPY SYSTEM

BACKGROUND OF THE INVENTION

1. Field of the Invention

The present invention relates to a remote copy system.

2. Description of the Related Art

The demand for automation of disaster recovery (DR) is increasing. In the DR, a remote copy function that multiplexes and retains data among multiple storage systems disposed at multiple sites and an operation of a storage system using this function are known in preparation for data loss in the event of a disaster such as an earthquake or fire.

In the event of a disaster at the primary site, operations are performed to switch the operations of both the server system and the storage system to the secondary site. With the remote copy function, it takes time for a write response from the server system between sites that are far from each other. Therefore, it is common to use asynchronous remote copy that the storage system transfers data to the copy destination storage system after the completion response to the write command from the server system.

U.S. Patent Application Publication No. 2005/0033827 discloses a technique for performing asynchronous remote copy using a journal that is information indicating a history related to updating of original data.

Upon receiving the write command, the copy source storage system at the primary site writes data to the data write volume and journal data to the journal volume, and returns a response to the server system. The copy destination storage system at the remote site reads journal data from the journal volume of the copy source storage system asynchronously with the write command and stores the journal data in its own journal volume. Then, the copy destination storage system restores the data copied to the copy destination data write volume based on the stored journal data.

If a failure occurs in the copy source storage system, the I/O to the copy source storage system is stopped, and the same operation environment as the copy source storage system is completely reproduced on the copy destination storage system. Then, the I/O is resumed to continue the operation.

SUMMARY OF THE INVENTION

Stopping I/O when the failure occurs causes performance degradation. The same operation environment as the copy source storage system is desirably reproduced on the copy destination storage system without stopping I/O. Furthermore, the application program (AP) running on the server system desirably continues operation immediately after failover (F.O.) to the copy destination storage system after a failure without being aware of the configuration of the storage system. During the F.O., if there are untransferred journals in the copy destination storage system, desirably, the AP recognizes that the journals are in a state just before reflection and continues operation in the copy destination storage system.

On the other hand, the copy source storage system sets QoS such as whether to perform functions (for example, deduplication or compression) on the volume by volume operation and LDEV Gurad (setting to make the volume read-only or inaccessible). The QoS setting also reproduces the transition operation environment in the copy destination storage system.

The present invention has been made in view of the above problems, and an object of the present invention is to provide a remote copy system capable of quickly and reliably reproducing an operation environment at a secondary site when a failure occurs at a primary site.

In order to solve the above problems, a remote copy system according to one aspect of the present invention includes: a primary site including a first server system and a first storage system connected to the first server system; and a secondary site including a second server system and a second storage system connected to the second server system.

The first server system and the second server system are clustered, and a virtual storage system is configured by the first storage system and the second storage system. An asynchronous remote copy is performed with the first storage system as a copy source and the second storage system as a copy destination. The first and second storage systems are configured to detect a failure of the second or first storage system that is a destination of the asynchronous remote copy.

The first storage system includes a data volume, a journal volume, and a storage controller. When an operation is received from the first server system, based on the operation, the storage controller executes any of a work of storing the update content by the operation in the journal volume or a work of executing the operation after the operation is received.

According to the present invention, it is possible to realize a remote copy system that can quickly and reliably reproduce the operation environment at the secondary site when a failure occurs at the primary site.

BRIEF DESCRIPTION OF THE DRAWINGS

FIG. 7 is a diagram illustrating an example of a journal table of the remote copy system according to the first embodiment;

FIG. 8 is a diagram illustrating an example of an operation reflection method table of the remote copy system according to the first embodiment;

DESCRIPTION OF THE PREFERRED EMBODIMENTS

Figure 1:
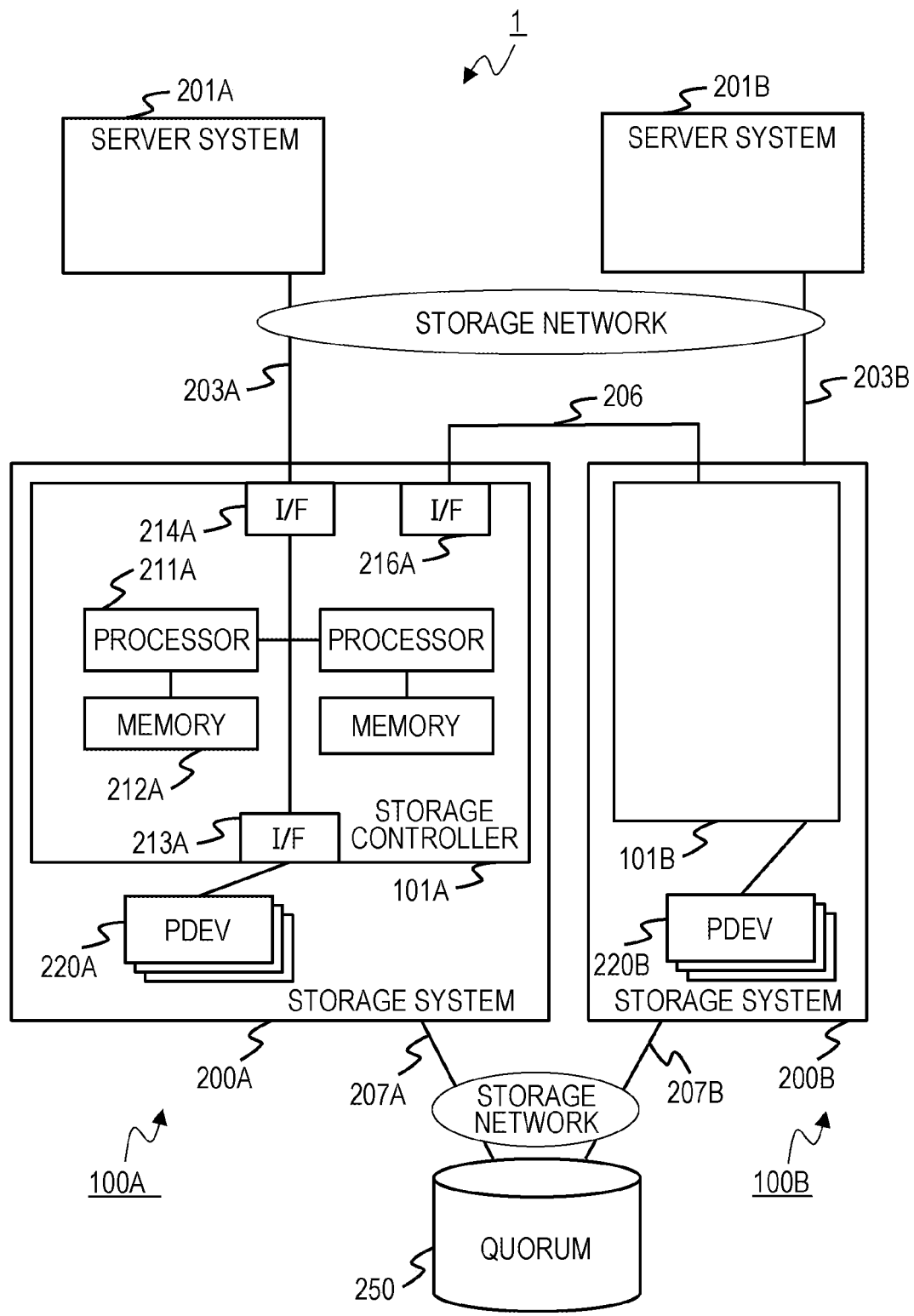
FIG. 1 is a diagram illustrating a physical configuration of a remote copy system according to a first embodiment.

Hereinafter, embodiments of the invention will be described using the drawings. The embodiments described below do not limit the invention according to the claims. In addition, all of the elements and combinations described in the embodiments are not necessarily essential for solving the invention.

In the following description, the "interface unit" may be one or more interfaces. The one or more interfaces may be one or more communication interface devices of the same type (for example, one or more network interface cards (NIC)) or two or more different communication interface devices (for example, an NIC and a host bus adapter (HBA)).

In the following description, the "memory unit" is one or more memories, and may typically be a main storage device. At least one memory in the memory unit may be a volatile memory or a nonvolatile memory.

In the following description, the "PDEV unit" is one or more PDEVs, and may typically be an auxiliary storage device. The "PDEV" means a physical storage device, and is typically a nonvolatile storage device, for example, a hard disk drive (HDD) or a solid state drive (SSD). Alternatively, a flash package may be used.

The flash package is a storage device that includes a nonvolatile storage medium. The configuration example of the flash package includes a controller and a flash memory which is a storage medium for storing write data from the computer system. The controller includes a logic circuit having a drive I/F, a processor, a memory, and a flash I/F, which are interconnected via an internal network.

In the following description, the "storage unit" is at least one of the memory unit and the PDEV unit (typically, at least the memory unit).

In the following description, the "processor" is one or more processors. At least one processor is typically a microprocessor such as a central processing unit (CPU), but may be another type of processor such as a graphics processing unit (GPU). At least one processor may be single-core or multi-core.

Further, the at least one processor may be a processor in a broad sense such as a hardware circuit (for example, a field-programmable gate array (FPGA) or an application specific integrated circuit (ASIC)) that performs a part or all of the processes.

Also, in the following description, in some cases, the information that can be output for input is described by the expression such as "xxx tables". However, this information may be data having any structure or a learning model such as a neural network that generates an output corresponding to an input. Therefore, "xxx table" can be called "xxx information".

Also, in the following description, the configuration of each table is an example, and one table may be divided into two or more tables, or all or some of the two or more tables may be one table.

Also, in the following description, in some cases, a process is described with "program" as the subject. However, the program is executed by the processor to appropriately perform a determined process by using the storage unit and/or the interface unit, and thus, the subject of the process may be a processor (or a device such as a controller having the processor).

The program may be installed in a device such as a computer, or may be, for example, in a program distribution server or a recording medium which can be read by a (for example, non-transitory) computer. Further, in the following description, two or more programs may be realized as one program, or one program may be realized as two or more programs.

In the following description, a "computer system" is a system including one or more physical computers. The physical computer may be a general-purpose computer or a special-purpose computer. The physical computer may function as a computer (for example, a host computer or a server system) that issues an input/output (I/O) request or may function as a computer (for example, a storage device) that performs I/O of data in response to the I/O request.

That is, the computer system may be at least one of a server system that issues an I/O request, and a storage system that is one or more storage devices that perform I/O of data in response to the I/O request. At least one physical computer may execute one or more virtual computers (for example, virtual machines (VMs)). The virtual computer may be a computer that issues an I/O request or may be a computer that performs data I/O in response to an I/O request.

The computer system may be a distributed system including one or more (typically, a plurality) of physical node devices. The physical node device is a physical computer.

In addition, when a physical computer (for example, a node device) executes predetermined software, a software-defined anything (SDx) may be configured in the physical computer or a computer system including the physical computer. For example, a software defined storage (SDS) or a software-defined datacenter (SDDC) may be adopted as the SDx.

For example, a storage system as the SDS may be configured by executing software having a storage function by a physical general-purpose computer.

Also, at least one physical computer (for example, a storage device) may be executed by one or more virtual computers as a server system and a virtual computer as a storage controller (typically, as a device that inputs and outputs data with respect to the PDEV unit in response to an I/O request) of the storage system.

In other words, such at least one physical computer may have both a function as at least a part of the server system and a function as at least a part of the storage system.

Further, the computer system (typically, a storage system) may have a redundant configuration group. The redundant configuration may be a configuration with a plurality of node devices such as erasure coding, redundant array of independent nodes (RAIN) and mirroring between nodes, or may be a configuration with a single computer (for example, a node device) such as one or more redundant array of independent (or inexpensive) disks (RAID) groups as at least a part of the PDEV unit.

In the following description, an identification number is used as identification information of various objects, but identification information of a type other than the identification number (for example, an identifier including an alphabetic character or a code) may be adopted.

In the following description, reference numerals (or common reference symbols) may be used when describing the same kind of elements without distinguishment, and an identification number (or reference number) of the element may be used when describing the same kind of elements separately.

The remote copy system of this embodiment has the following configuration as an example.

An asynchronous remote copy configuration is made as an HA configuration. By recording the I/O received on the primary site and the volume operation for setting the QoS for the volume on the primary site in the journal volume on the primary site, and transferring the journal to the secondary site, the I/O and the QoS setting can be reproduced at the secondary site.

As a further configuration, there is the following configuration. If a failure occurs while the journal has not been transferred to the secondary site, the contents indicated by the untransferred journal cannot be reproduced at the secondary site. The journal also records volume operations for QoS settings. However, unlike the I/O, the QoS setting does not necessarily guarantee the order. Because of that, in the volume operation of the QoS setting, when the request is received at the primary site, the request also may be issued to the secondary site without registering the request in the journal. In this way, the volume operation of the QoS setting can be reflected on the secondary site earlier than the journalizing method.

As described above, in order to select a reflection method for the secondary site according to the operation of the volume of the write request or the QoS setting, a process of determining in advance the reflection method for the secondary site is performed for each operation.

When the operation is received, the type of the operation is determined, and a reflection method for the secondary site is selected based on the determined method.

First Embodiment

Hereinafter, a first embodiment will be described with reference to the drawings.
<System Configuration>

Figure 2:
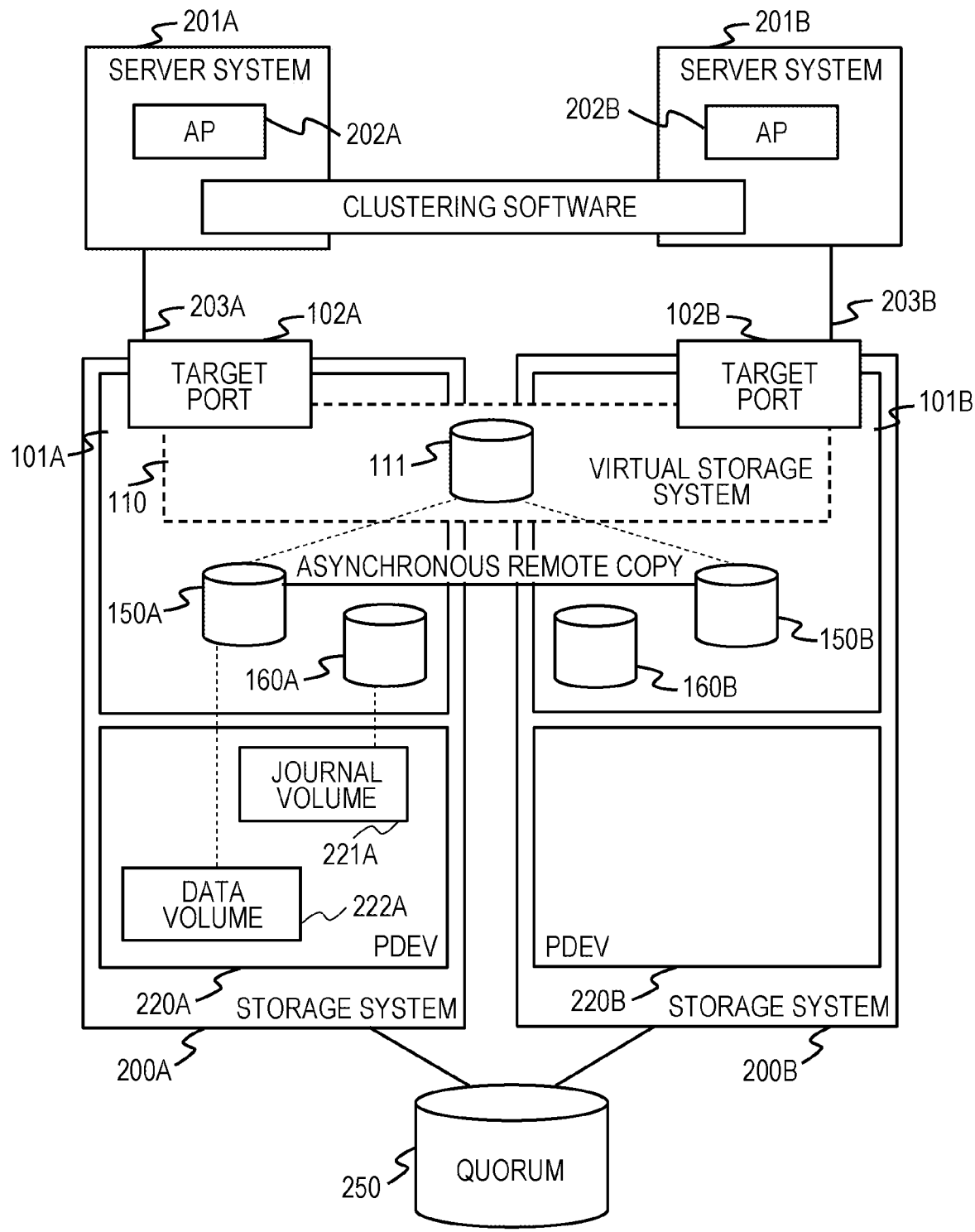
FIG. 2 is a diagram illustrating a logical configuration of the remote copy system according to the first embodiment.

FIG. 1 is a diagram illustrating a physical configuration of a remote copy system 1 according to the first embodiment. FIG. 2 is a diagram illustrating a logical configuration of the remote copy system 1 according to the first embodiment.

The importance of disaster recovery (DR) as a measure against disasters such as earthquakes is increasing. A remote copy is one of the configurations for achieving high availability (HA) of a storage system.

A storage system 200 has two or more sites, for example, a primary site (primary site) 100A and a secondary site 100B (secondary site) in order to have a remote copy configuration. Hereinafter, for simplicity of description, reference symbols of the elements of the primary site 100A are a combination of a parent number and a child code "A", and reference symbols of the elements of the secondary site 100B are a parent number and a child code "B". When there is no need to distinguish between the primary site 100A and the secondary site 100B, the reference numerals are only the parent numbers.

The primary site and the secondary site in the remote copy configuration are often configured with the same model of storage system, but the purpose of the invention is to provide a system that can continue a process by failover when a failure occurs. Since the remote copy function is used as one of the means without aiming to form a remote copy configuration, it is not the essence of the invention to make a model of a storage system having a remote copy configuration match.

A data volume 222A (see FIG. 2) of a storage system 200A, which is the copy source of data replication by remote copy, on the primary site 100A side is hereinafter referred to as "PVOL (primary volume)", and a data volume (not illustrated in FIG. 2) of a storage system 200B, which is the replication destination of the data stored in the PVOL, on the secondary side is hereinafter referred to as "SVOL (secondary volume, secondary side (S) volume)". The storage source of the replicated data is called a primary site or a local site, and the storage destination of the replica is called a secondary site or a remote site.

The remote copy function is largely divided into two types of copies of a "synchronous remote copy" in which the storage system transfers data to the copy destination storage system in synchronization with a write command from the server system and an "asynchronous remote copy" in which the storage system transfers data to the copy destination storage system after a completion response to the write command from the server system.

Regardless of which remote copy function is used, when a disaster occurs at the primary site, the operations of both the server system and the storage device are switched to the secondary site. As a result, even if a disaster occurs at the site, data loss and operation suspension can be minimized.

The synchronous remote copy has the advantage that the copy source data and the copy destination data are always synchronized, but it takes a long time to respond to the write from the server system. Thus, it is common to use the asynchronous remote copy between sites with a long distance. Further, the storage system may be equipped with a flash medium, and the asynchronous remote copy is also used to take advantage of the high performance of the flash medium.

The following description is based on the adoption of the asynchronous remote copy function.

As another HA method, there is also a method of setting up a remote copy configuration for each volume. Here, a method of determining a copy source and a copy destination for each storage system 200 is described.

The storage system 200 has a storage controller 101 as illustrated in FIG. 1. The storage controller 101 is an example of a controller including a processor 211. The storage controller 101 has a virtual storage system function, an asynchronous remote copy function, and a failure management function for processing failure detection and failover.

The storage system 200 includes a PDEV 220 that is a plurality (or one) of physical storage devices and a storage controller 101 connected to the PDEV 220.

The storage controller 101 includes an I/F 214, an I/F 215, an I/F 213, a memory 212, and a processor 211 connected thereto. The I/F 214, the I/F 216, and the I/F 213 are examples of the interface unit. The memory 212 is an example of a storage unit. The processor 211 is an example of a processor.

The I/F 214 is a communication interface device that mediates data exchange between the server system 201 and the storage controller 101. The server system 201 is connected to the I/F 214 via a Fibre Channel (FC) network 203.

The server system 201 transmits an I/O request (write request or read request) for specifying a logical volume number such as an I/O destination (for example, logical unit number (LUN) or a logical address such as logical block address (LBA)) to the storage controller 101. The server system 201 includes, for example, an input device, an output device, a central processing unit (CPU), a memory, a disk adapter, a network adapter, and a storage device (not illustrated). In each server system 201, an application program (AP) 202 (see FIG. 2) used by the user and a storage system control program for controlling the interface with the storage controller 101 are also executed by the CPU of the server system 201.

The I/F 216 is a communication interface device that mediates exchange for forming an HA configuration between the storage system 200A and the storage system 200B. Since the HA configuration uses asynchronous remote copy, an I/F for remote copy may be used. The I/F 216 is connected to another storage system 200 via an inter-storage system network 206. The inter-storage system network 206 is often a global network such as a public line from the viewpoint of disaster recovery. However, if the storage systems are in the same room, in the same building, or in neighboring buildings, the network may be a local network. However, the present invention is not limited by such a network configuration.

The I/F 213 is a communication interface device that mediates data exchange between the plurality of PDEVs 220 and the storage controller 101. The plurality of PDEVs 220 are connected to the I/F 213.

The memory 212 stores a program executed by the processor 211 and data used by the processor 211. The processor 211 executes a program stored in the memory 212. For example, a set of the memory 212 and the processor 211 is duplicated.

The PDEV 220 is configured by a plurality of storage devices. The storage device is configured of, for example, a hard disk drive and mainly stores user data. A drive including a semiconductor memory such as a flash memory may be used as the storage device. The storage device configures a RAID group based on the RAID configuration.

In the PDEV 220, one or more logical storage areas (logical volumes) 221 and 222 (see FIG. 2) are created based on the RAID groups. The logical volume is associated with a physical storage area of the PDEV 220. These logical volumes are used as a data volume such as PVOL 150A or SVOL 150B and a journal volume 160 of a volume for storing a journal according to a user's specification.

The volumes 150 and 160 may be so-called LDEVs of which the volume capacity matches the actual capacity or may be thin provisioning volumes that allocate pages (storage area units) from a pool. Further, all volumes may be configured based on the storage medium provided in another storage system (not illustrated). In this case, when the volume is accessed from the server system, the accessed storage system communicates with another storage system including a storage medium and responds to the server system.

Note that the storage system 200 can also be called a storage device or a storage subsystem.

A Quorum 250 is a storage area disposed in a device other than the storage system 200A and the storage system 200B, for example, the storage system 200. When communication becomes impossible between the storage system 200A and the storage system 200B in the HA configuration, a function is provided for determining which of the storage system 200A and the storage system 200B in the HA configuration is to be continuously operated and which is to be stopped.

For example, the storage system 200A and the storage system 200B write the state of each storage system and the state of communication with the other storage system viewed from each storage system to the Quorum 250. The mutual storage systems refer to the Quorum 250 periodically or in synchronization with the I/O response, and determine the storage system to be continuously operated and the storage system to be stopped based on the information written to the Quorum 250.

The network 203 and the network 207 may be storage networks. Data is transmitted and received between the server system 201A (server system 201B) and the storage system 200A (storage system 200B) via the storage network. The storage systems 200 communicate with each other via a storage network.

As illustrated in FIG. 2, the storage system 200A and the storage system 200B provide a virtual storage system 110 to the server system 201A and the server system 201B.

The volume 150A, which is the volume of the storage system 200A, and the volume 150B, which is the volume of the storage system 200B, store the same data, show the same identifier (for example, ID) to the server system 201, and are provided as one virtual volume 111 of the virtual storage system 110.

The identifier of the virtual storage system 110 (for example, the serial number (S/N)) is XXX. On the other hand, the storage system 200A and the storage system 200B have a serial number AAA and a serial number BBB, respectively. The server system 201 recognizes the virtual storage system 110 as a storage system of the serial number XXX including a target port 102A and a target port 102B.

The volumes 150A and 150B configure an HA volume pair, and configure one virtual volume 111. The IDs of the volumes 150A and 150B are 10:00 and 30:00, respectively. On the other hand, the ID of the virtual volume 111 is 20:00.

The server system 201 is provided with the virtual volume 111 from the virtual storage system 110, and recognizes the volume of which the VOL ID is 20:00. The storage system 200A is a primary site (normal system) that performs normal operations, and the storage system 200B is a secondary site (standby system, standby site) that reproduces the data state of the primary site to continue operations when a failure occurs in the primary site. The server system 201 can access the virtual volume 111 via any of the target ports 102A and 102B. The server system 201A accesses the virtual volume 111 only through the target port 102A, and the server system 201B accesses the virtual volume 111 only through the target port 102B.

The server system 201A and the server system 201B are operated as one system in cooperation with each other by clustering software. Thus, even if a failure occurs in the server system 201A, the operation can be continued in the server system 201B.

Although not illustrated in FIGS. 1 and 2, the remote copy system 1 may be provided with a management device. The management device manages the configuration of the storage area of the storage system 200, and includes, for example, an input device, an output device, a CPU, a memory, a network adapter, and a storage device. The Quorum 250 may serve as the management device.

Figure 3:
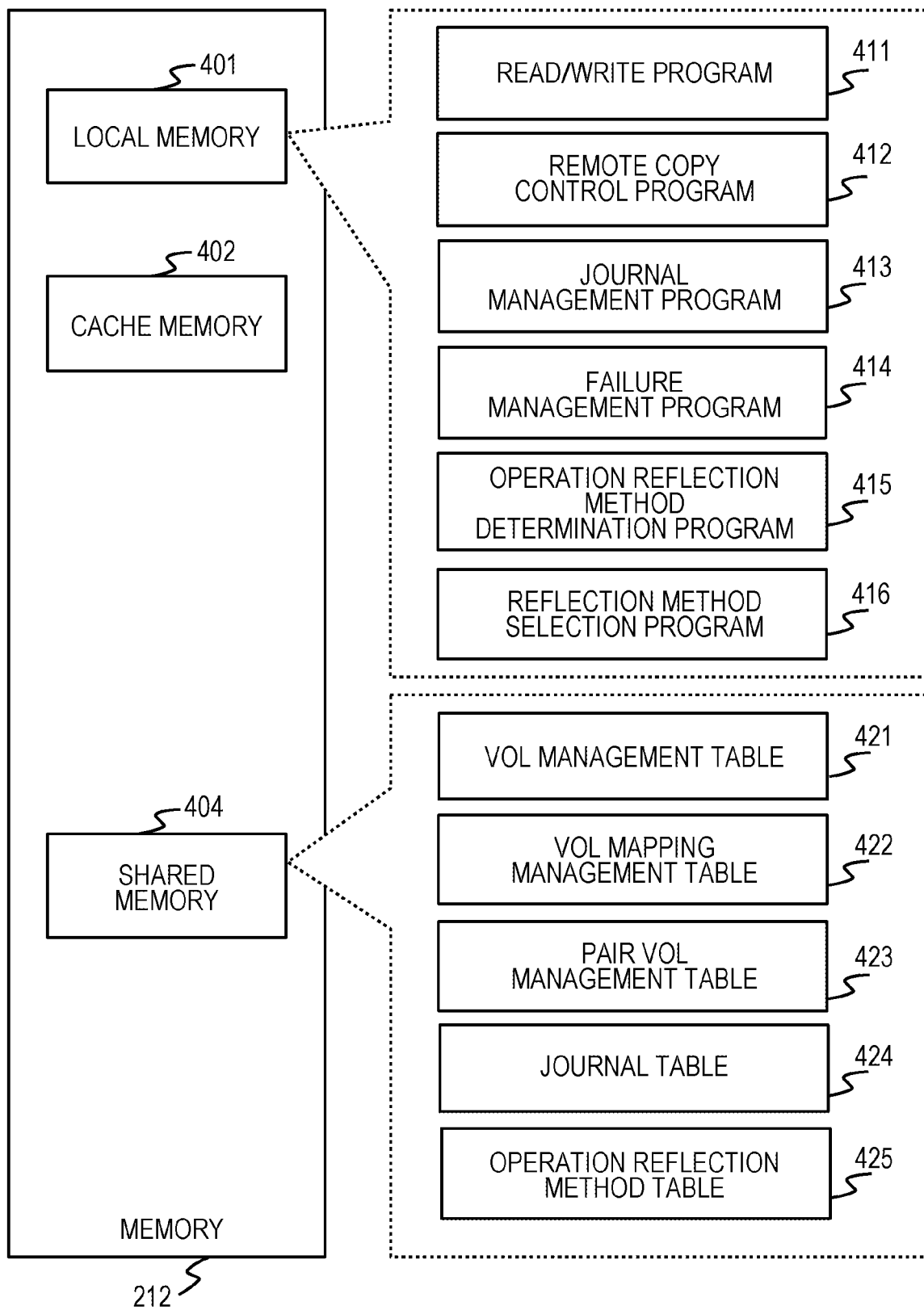
FIG. 3 is a diagram illustrating an example of a memory configuration of a storage controller of the remote copy system according to the first embodiment.

FIG. 3 is a diagram illustrating an example of the configuration of the memory 212 of the storage controller 101 of the remote copy system 1 according to the first embodiment, and more specifically, a diagram illustrating an example of the configuration of the memory 212 and a program and management information in the memory 212.

The memory 212 includes memory areas called a local memory 401, a cache memory 402, and a shared memory 404. At least one of these memory areas may be an independent memory. The local memory 401 is used by the processors 211 belonging to the same set as the memory 212 including the local memory 401.

The local memory 401 stores a read/write program 411, a remote copy control program 412, a journal management program 413, a failure management program 414, an operation reflection method determination program 415, and a reflection method selection program 416. These programs will be described later. In addition, programs (not illustrated) are also stored in the shared memory 404.

The cache memory 402 temporarily stores a data set to be written to or read from the PDEV 220.

The shared memory 404 is used by both the processor 211 belonging to the same set as the memory 212 including the shared memory 404 and the processor 211 belonging to a different set. The shared memory 404 stores management information.

The management information includes a VOL management table 421, a VOL mapping management table 422, a pair VOL management table 423, a journal table 424, and an operation reflection method table 425. The volume is described as VOL.

<Management Information>

Next, a configuration example of each table as management information will be described.

Figure 4:
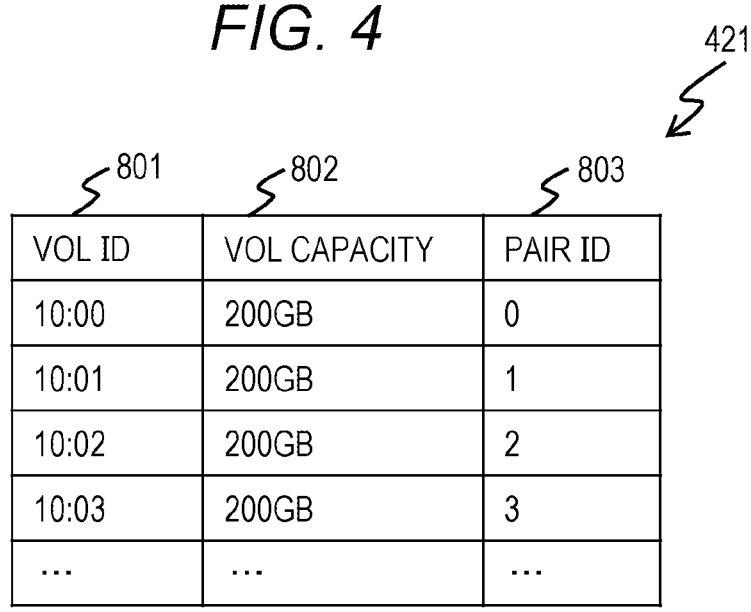
FIG. 4 is a diagram illustrating an example of a VOL management table of the remote copy system according to the first embodiment.

FIG. 4 is a diagram illustrating an example of the VOL management table 421 of the remote copy system 1 according to the first embodiment.

The VOL management table 421 holds information on VOL. For example, the VOL management table 421 has an entry for each VOL. Each entry stores information such as a VOL ID 801, a VOL capacity 802, and a pair ID 803. Hereinafter, one VOL (referred to as "target VOL") will be described as an example.

The VOL ID 801 is information on the number (identification number) of the target VOL. The VOL capacity 802 is information on the capacity of the target VOL, and indicates a so-called volume size. The pair ID 803 is pair information that forms an HA configuration with the VOL ID 801 and indicates the pair ID of the pair VOL management table 423.

Although not illustrated, the VOL management table 421 further manages information such as attributes (whether the volume is a volume performing I/O or a journal volume) of the volume, a physical hard disk number group that configures the volume, a RAID level that configures the volume from the physical hard disk, LU numbers, and physical port numbers.

Figure 5:
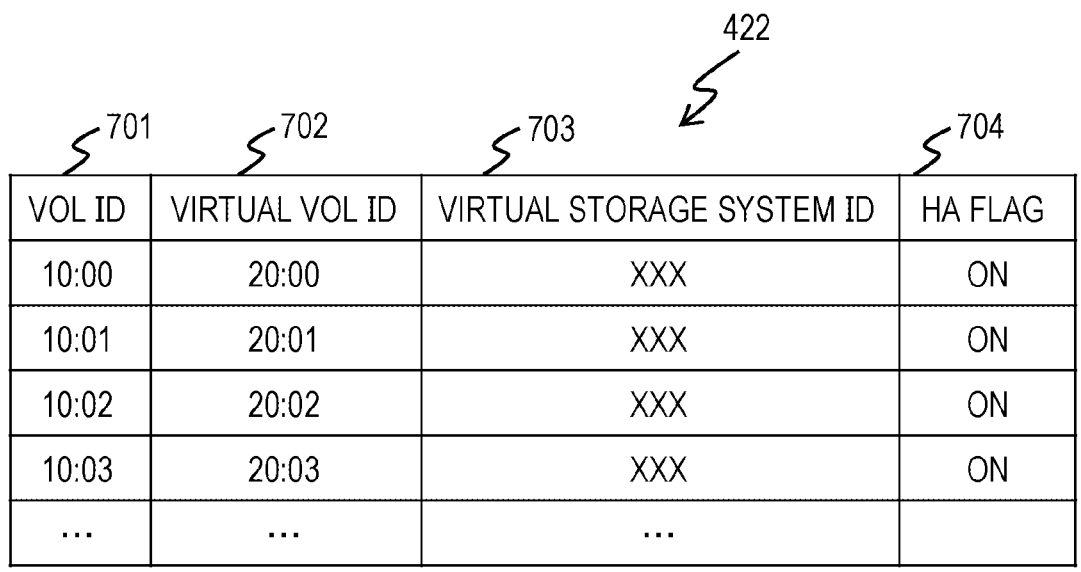
FIG. 5 is a diagram illustrating an example of a VOL mapping management table of the remote copy system according to the first embodiment.

FIG. 5 is a diagram illustrating an example of the VOL mapping management table 422 of the remote copy system 1 according to the first embodiment.

The VOL mapping management table 422 associates the real configuration information of the volume of the storage system 200 and the virtual configuration information. Specifically, the VOL mapping management table 422 has a VOL ID 701, a virtual VOL ID 702, a virtual storage system ID (for example, a product number) 703, and an HA flag 704.

Each entry indicates a virtual VOL ID associated with a volume, a virtual storage system ID that provides the virtual volume, and whether or not the volume forms an HA volume pair. When the value of the HA flag is ON, the volume forms an HA volume pair with another volume. Here, all the volumes have an HA configuration, and thus all the values are ON. The HA configuration is a remote copy configuration.

Figure 6:
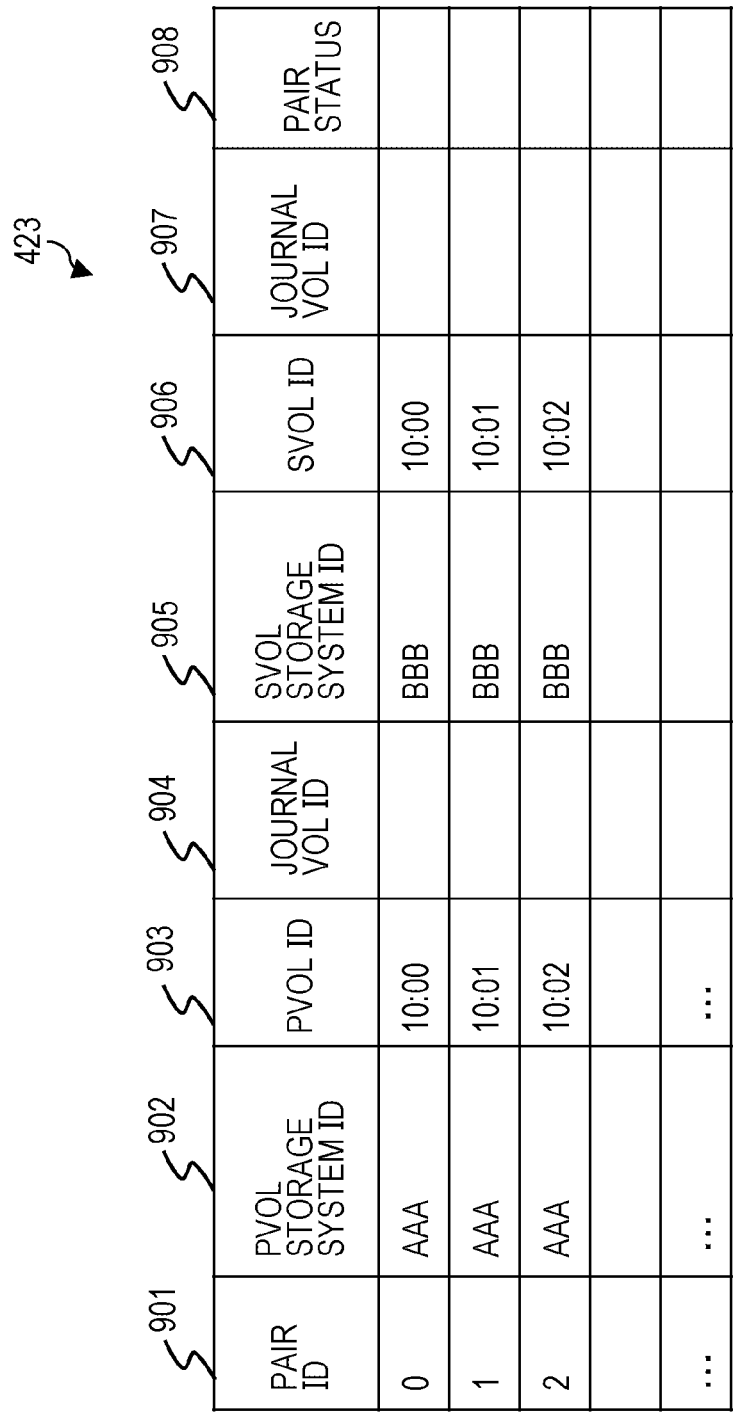
FIG. 6 is a diagram illustrating an example of a pair VOL management table of the remote copy system according to the first embodiment.

FIG. 6 is a diagram illustrating an example of the pair VOL management table 423 of the remote copy system 1 according to the first embodiment.

The pair VOL management table 423 is information for managing a remote copy pair. The pair VOL management table 423 is stored at least on the storage system 200A side. Here, the table is stored in the storage system 200.

The PVOL ID indicates the volume that is the copy source of the remote copy. The SVOL indicates the volume that is the copy destination of the remote copy.

The pair VOL management table 423 includes a pair ID 901 for identifying the remote copy pair, a PVOL storage system ID 902, a PVOL ID 903, and a journal VOL ID 904 for storing the journal as PVOL information that is the replication source of the remote copy data, a SVOL storage system ID 905, a SVOL ID 906, and a journal VOL ID 907 for storing the journal as SVOL information that is the replication destination of remote copy data, and a pair status 908.

The storage system ID 902 and the storage system ID 904 are identifiers of each storage system 200 in which the volume exists, for example, a serial number (S/N).

The PVOL ID 903 and the journal VOL ID 904, and the SVOL ID 906 and the journal VOL ID 907 are identifiers of the volumes in each storage system 200. The volume is uniquely determined by the each ID.

The pair status 908 indicates a replication status and is expressed by a status "COPY" indicating that data is being copied from one volume of the pair to the other volume, a status "PAIR" indicating that two volumes in the pair are synchronized, and a status "SUSPEND" indicating that two volumes in the pair are asynchronous.

FIG. 7 is a diagram illustrating an example of the journal table 424 of the remote copy system 1 according to the first embodiment.

The journal is information indicating a history regarding updating of the original data. The journal is configured of a data portion that is a copy of data and data management information. The management information includes information of data update performed in the PVOL 150A, and includes, for example, a VOL ID 1001, a start LBA 1002, a number of blocks 1003, a sequence number 1004, a time 1005, data 1006, and an operation 1007.

The VOL ID 1001 is information for specifying the PVOL 150A. The start LBA 1002 is a logical block address indicating the head of write data written to the PVOL 150A. The number of blocks 1003 is information indicating the data size of the write data. The sequence number 1004 is an identification number set in the journal data as a serial number. The time 1005 is the time at which the write request is issued. The data 1006 is pointer information indicating the position (address) where the data body is stored. An operation 1007 is stored when there is a request other than the write request, for example, a request (a command or the like) for processing QoS setting and snapshot acquisition. In the case of a write request, the write request may be stored in operation 1007, but this information is not used in principle. If there is a request for volume setting or the like, the request is registered in operation 1007, and if the request is not a write request, the start LBA 1002, the number of blocks 1003, and the data 1006 are not used.

FIG. 8 is a diagram illustrating an example of the operation reflection method table 425 of the remote copy system 1 according to the first embodiment.

An operation type 501 is a processing request for a volume received by the primary site, such as a write request, QoS setting, or snapshot. An executor 502 is a request source of the operation, and is the AP 202 of the server system 201 or a storage administrator. The storage administrator issues a request via a device such as a management device or a terminal connected to the remote copy system 1. A secondary site reproduction method 503 selects and registers a reproduction method for reproducing the operation at the secondary site.

In the secondary site reproduction method 503, for example, a method 1 is a method of transmitting a request to a secondary site when the request is received, and a method 2 is a method of journalizing and reproducing the journal at the secondary site.

Figure 9:
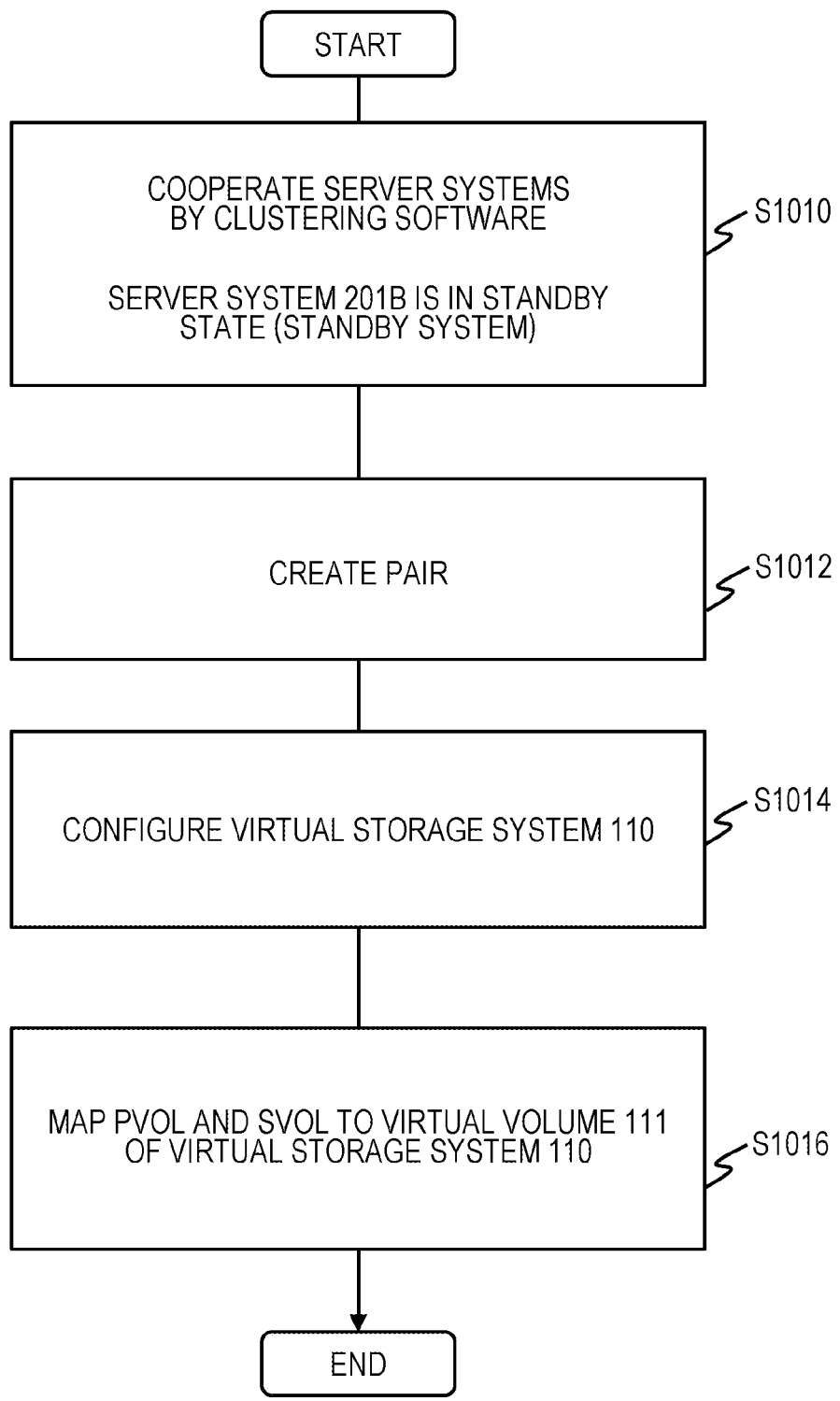
FIG. 9 is a flowchart illustrating an example of an operation at the time of setting of the remote copy system according to the first embodiment.

FIG. 9 is a flowchart illustrating an example of an operation at the time of setting of the remote copy system 1 according to the first embodiment.

The server system 201A and the server system 201B cooperate by clustering software (S1010). The plurality of server systems 201 linked by the clustering software are operated as one system.

The server system 201A on the primary site 100A performs normal operation in the normal system, the server system 201B on the secondary site 100B side stands by in the standby system, and I/O is not accepted while the normal system is operating. If the normal server system 201A cannot operate due to a failure, the server system 201B becomes the normal system by failover to the server system 201B, and the AP 202B continues processing instead of the AP 202A. For this reason, it is necessary to match the data stored in the storage system 200 of the primary site 100A and the secondary site 100B, the QoS setting for the volume, and the like.

Therefore, the storage system 200A at the primary site 100A and the storage system 200B at the secondary site 100B are connected via the inter-storage system network 206 to form a remote copy.

The remote copy control program 412 forms a remote copy pair with the volume in the storage system 200A as the primary volume (PVOL) 150A for remote copy and the volume in the storage system 200B with the secondary volume (SVOL) 150B for remote copy.

For example, a pair creation command is issued to the storage system 200 from a graphical user interface (GUI) or the like of the server system 201 or a maintenance terminal (or a management device) installed in the storage system 200, and the PVOL 150A of the storage system 200A which is used as the copy source for data replication is associated with the SVOL 150B of the storage system 200B which is used as the replication destination of data stored in the PVOL 150A as a pair (S1012). After the pair is created, the pair is registered in the pair VOL management table 423.

Here, there is no need to set and form a conventional remote copy configuration, and it is desired to perform operations and data transfer between the storage systems 200 using the remote copy journal transfer technology of the remote copy. By creating a pair, the pair is allocated to a virtual volume described later. A virtual storage system may be configured, and the volumes of two storage systems 200 may be allocated to a virtual volume to be registered as a pair. In the primary site 100A and the secondary site 100B, the hardware configuration, the hardware performance, and the number may be the same or may differ.

Further, using the journal management program 413 of each site, a journal volume storing a journal corresponding to the pair of PVOL 150A and SVOL 150B is allocated and registered in the pair VOL management table 423. Thus, the data of the copy source storage system 200A at the primary site can be reflected on the copy destination storage system 200B on the secondary site in the order of operations of commands for data, I/O, and volumes or the like.

Next, the virtual storage system 110 is set (S1014). The setting method is as described above with reference to FIG. 2.

Both the PVOL 150A of the storage system 200A at the primary site and the SVOL 150B of the storage system 200B at the secondary site of the created pair are mapped to the virtual volume 111 of the virtual storage system 110, and registered in the VOL mapping management table 422 (S1016).

As a result, even if a failure occurs in the server system 201A, the operation can be continued by failover to the server system 201B.

The server system 201A and the server system 201B transmit a read/write instruction to one virtual volume 111, and the instruction is actually transmitted to the volume 150A.

Figure 10:
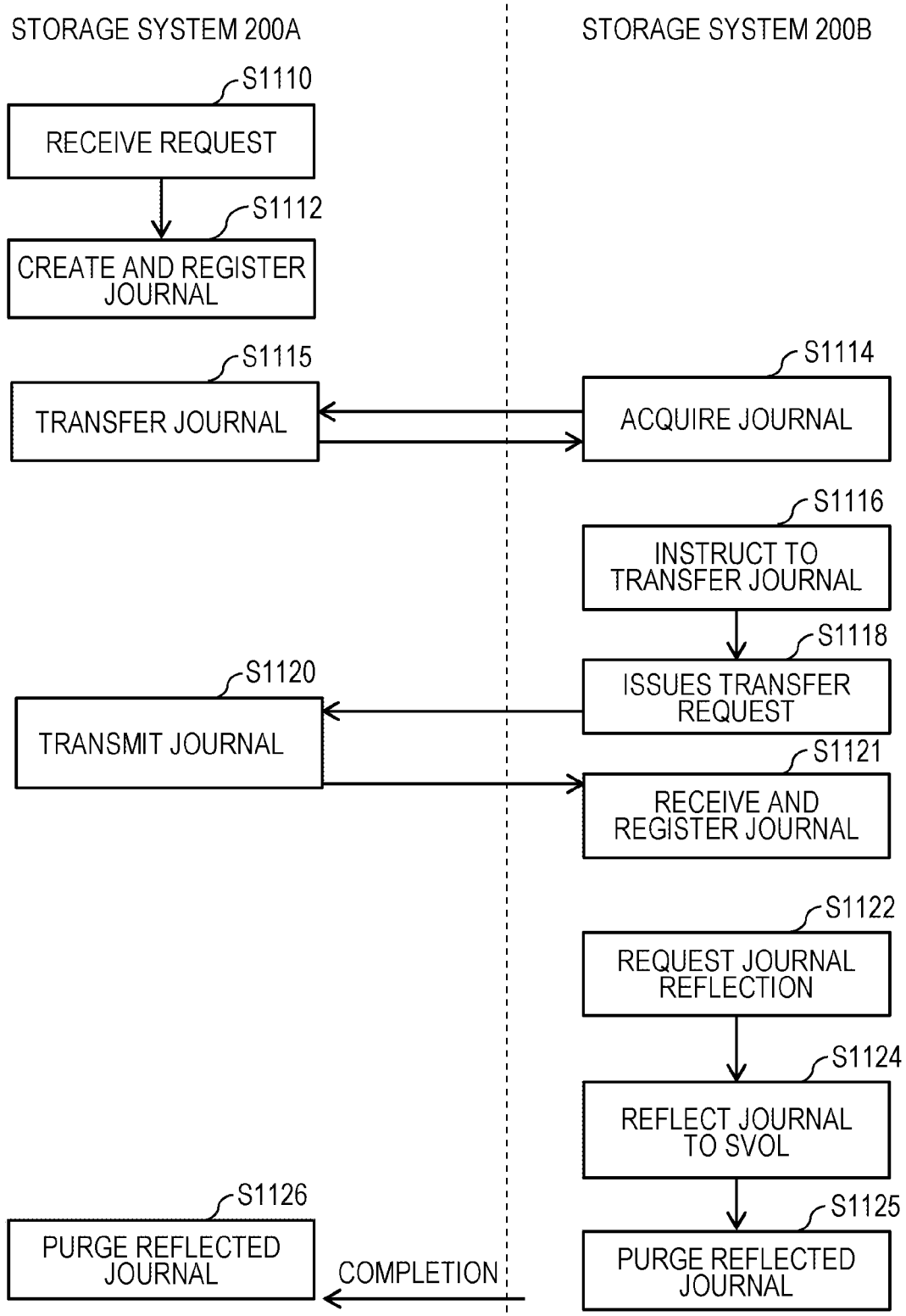
FIG. 10 is a flowchart illustrating an example of a journal process of the remote copy system according to the first embodiment.

FIG. 10 is a flowchart illustrating an example of the journal processing of the remote copy system 1 according to the first embodiment.

As illustrated in FIG. 9, in a system having an HA configuration using the remote copy technology and the virtual storage system technology, a request to the storage system 200A at the primary site 100A is accepted during normal operation.

When receiving a write request to the remote copy source volume PVOL 150A from the server system 201A (S1110), the read/write program 411 of the storage system 200A executes processing for writing the received data to the address of the specified PVOL 150A according to the write request. When executing the write request, the journal management program 413A creates a journal of the executed write request. The VOL ID of the volume as a target of the write request is referenced from the VOL management table 421, and the write target position indicated in the write request is registered in each of the start LBA 1002 and the number of blocks 1003. The time at which the write request is received is registered in the time 1005.

The write data is replicated for the journal and separately stored in the storage area of the journal dedicated area, and the address to the storage area is registered in the data 1006. The journal created as described above is registered in the journal table 424, and the journal table 424 is stored in the journal volume 160A (S1112).

Here, the journal management program 413 determines the journal storage destination with reference to the VOL management table 421, the paired VOL management table 423, and the journal table 424 stored on the shared memory 404 of the storage system 200A, acquires the number next to the latest sequence number 1004 of the journal table 424 as a sequence number, and creates a new journal to add the journal to the journal table 424 in the journal volume 160A.

When the writing to the storage system 200A is completed, the storage system 200A sends a write completion response to the server system 201A. The transfer of the journal from the storage system 200A to the storage system 200B is performed asynchronously with the write request.

The storage system 200B acquires the journal information of the storage system 200A at a predetermined timing such as at regular intervals. In the storage system 200B, the journal management program 413B transmits a request for acquiring information on the journal creation status from the storage system 200A to the storage system 200A (S1114). The information on the journal creation status is the capacity of the journal in the journal volume, the oldest time of the journal, and the like.

The journal management program 413A transfers information on the journal creation status to the storage system 200B according to the request (S1115). The journal management program 413B creates a journal transfer request using the acquired information.

Next, a process of transferring a journal from the storage system 200A to the storage system 200B will be described.

In the storage system 200B, when a journal transfer instruction is generated according to an input of an instruction from a user via a GUI or a predetermined schedule, the journal management program 413B issues a journal transfer request to the storage system 200A (S1116). For example, the schedule is made such that a fixed amount of journals are stored in the journal volume 160A in the storage system 200A or is made regular intervals.

The journal transfer request includes a journal (or a plurality of journals) to be copied, the journal volume 160A storing the journal, information specifying the storage system 200A having the journal volume, and information for specifying the journal volume 160B storing the copied journal. The journal management program 413B creates a journal transfer request from the information acquired from the VOL management table 421 and the paired VOL management table 423 on the shared memory 404.

The journal management program 413B which receives the journal transfer request issues a read command for the journal specified in the journal transfer request to the storage system 200A (S1118).

The journal management program 413A of the storage system 200A which receives the read command transmits the journal specified by the read command to the storage system 200B (S1120). The journal management program 413B of the storage system 200B which receives the journal stores the received journal in the journal volume 160B specified by the journal transfer request (S1121).

Thereafter, the journal management program 413B of the storage system 200B issues a journal reflection request (S1122). The journal management program 413B which receives the journal reflection request writes the journal data to the SVOL 150B according to the journal sequence number of the journal volume 160B, thereby reflecting the data of the PVOL 150A to the SVOL 150B (S1124).

Thereafter, the area storing the journal used for reflection is purged (S1125). As a result, the area can be used for storing a new journal. Since the conventional journal is only a write request, when a snapshot is taken, the I/O to the storage system 200A and the storage system 200B is stopped, and the storage administrator issues a snapshot instruction to the storage system 200A and the storage system 200B at the same time. The snapshot acquisition can be automated by including a snapshot acquisition operation in the journal.

Further, the journal management program 413B notifies the journal management program 413A of the storage system 200A of the sequence number of the journal in which the data is reflected in the SVOL 150B. As a result, the journal management program 413A releases the area of the journal volume 160A of the storage system 200A in which the journal reflected on the SVOL 150B is stored (S1126). This area can be used for storing a new journal. It is not necessary to purge the journal immediately after receiving the notification. The journal may be purged periodically, or may be purged according to an instruction from the user.

According to the above journal process, asynchronous remote copy from the PVOL 150A to the SVOL 150B can be performed. With the remote copy technology, it is possible to maintain the order of operations between storage systems at remote locations.

In the above, the method in which the storage system 200A waits for a read command from the storage system 200B as in the described journal process is described. However, journal transfer may be performed by issuing a write command to write data from the storage system 200A to the storage system 200B.

The storage system 200B updates the journal data transferred from the storage system 200A to a corresponding location of the SVOL 150B corresponding to the SVOL information stored in the journal.

In the embodiment, the write request is described. However, when a request for QoS setting or the like comes to the volume of the storage system 200A, the request is similarly registered in the journal and executed. For example, when the storage system 200A creates a snapshot, the snapshot creation is registered in operation 1007 of the journal table 424, and the storage system 200B reads the journal and creates a snapshot of the SVOL 150B in response to the detection of the snapshot creation.

Figure 11:
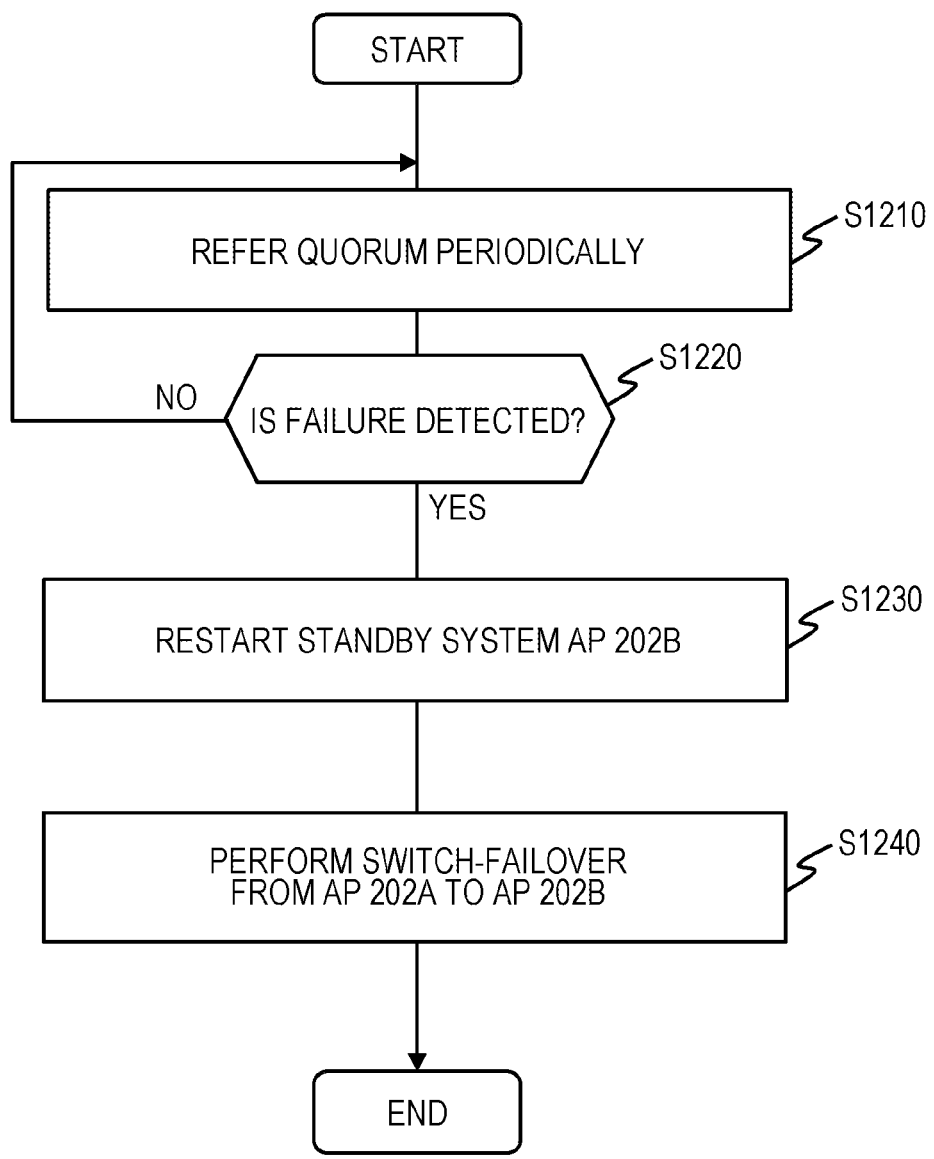
FIG. 11 is a flowchart illustrating an example of a failover process of the remote copy system according to the first embodiment.

FIG. 11 is a flowchart illustrating an example of a failover process of the remote copy system 1 according to the first embodiment.

A life check process is periodically executed between the storage system 200 and the Quorum 250.

As described above, the Quorum 250 is a storage area disposed in the storage system 200 other than the storage 200A at the primary site and the storage system 200B at the secondary site. The storage system 200A and the storage system 200B write the state of each storage system and the state of communication with the other storage system viewed from each storage system to the Quorum 250.

As an example, a process in which the storage system 200B monitors the alive state of the storage system 200A is described. The failure management program 414A of the storage system 200A sets 1 to a predetermined bit of the Quorum 250 periodically or in synchronization with an I/O response (S1210). The failure management program 414B periodically determines whether or not 1 is set to the predetermined bit in the Quorum 250 at predetermined time intervals (S1220). The storage system to be continuously operated and the storage system to be stopped are determined based on the predetermined bit.

If the predetermined bit is set to 1 when the value of the predetermined bit of the Quorum 250 is checked, it can be confirmed that the storage system 200A is operating normally. Upon confirmation, the failure management program 414B resets the predetermined bit of the Quorum 250 to 0 (zero). If the storage system 200A is operating normally, the bit is periodically set to 1 by itself, which is for monitoring. The process returns to S1210, and periodically refers to the predetermined bit of Quorum 250.

On the other hand, if the predetermined bit is set to 0 (zero) when the value of the predetermined bit of the Quorum 250 is checked, it can be determined that the predetermined bit cannot be reset due to the failure of the storage system 200A. The failure management program 414B detects that a failure occurs in the storage system 200A. The process proceeds to step S1230.

When the failure is detected, a reset instruction for resetting the storage system 200A is issued. The instruction may be issued to the Quorum 250. The storage system 200A may not be able to accept the reset instruction due to the failure. Only when possible, when receiving the reset instruction, the storage system 200A executes the reset process after responding to the Quorum 250 that the reset is completed.

Since it is detected that the storage system 200A is faulty, the storage system 200B instructs the AP 202B of the server system 201B to restart (S1230). The clustering software operates with the AP 202B as a normal system and starts the failover process. Thereafter, the access is switched from the AP 202B to the storage system 200B.

The storage system 200B receives, from the AP 202B, a request for a logical volume that is in charge of the failed storage system 200A (S1240). Since the logical volume recognized by the AP 202 is the virtual volume 111, the access to the virtual volume 111 does not change, and the SVOL 150B is mapped to the virtual volume 111 to continue the process. That is, the virtual volume 111 having the same identifier (ID) is simultaneously provided to the storage system 200A and the storage system 200B as a failover pair, and the storage system 200A is accessed during normal operation and the storage system 200B during failure.

After the failover, the storage system 200B at the time of the restoration is provided to the server system 201B, with the time at which the execution of the journal is completed as the restoration time. The AP 202B recognizes the storage system 200B at the restoration time and continues the process. The untransferred journal from the old primary site with the failure cannot be reproduced. The operation can be continued in a state slightly earlier than the latest state.

According to this embodiment configured as above, without making the AP 202 of the server system 201 aware of the configuration of the storage system 200, the F.O. can be performed with reflecting the operation environment on the copy destination storage system 200 including the volume operation.

Further, according to this embodiment, a Resurrectable remote copy system 1 can be provided which can reproduce the operation environment at the secondary site including the QoS setting for the volume by failover to the secondary site and can continue the operation even if a failure occurs at the primary site, and there is a journal that is not transferred from the primary site to the secondary site.

Further, the remote copy system 1 of this embodiment can exhibit high availability. The same configuration as the storage configuration information recognized by the AP 202 and the storage administrator can be realized in the primary and secondary sites without placing a load on the AP 202. Conventionally, when a failure occurs in the storage system 200, an administrator and a technician with specialized knowledge are required to investigate the failure state and perform failover. However, according to this embodiment, automatic failover can be realized in conjunction with clustering software and the Quorum 250. Recovery from failure can be facilitated and accelerated. By using a journal, a copy process can be performed in I/O units, so that recovery point objective (RPO) is small. Engineers with specialized knowledge are not required.

Note that the Quorum 250 itself manages, as a management device, the status of the storage system 200, and when the occurrence of a failure is detected in any of the storage systems 200, a reset instruction may be issued to the failure occurrence source storage system, and a failover instruction may be issued to the storage system 200 of a failover destination.

If a response cannot be made due to a failure, whether to start a failover process may be determined depending to time over.

The storage system 200A may have a path for monitoring whether the other storage system is operating normally by performing hard beat communication with the partner storage system 200B that forms the pair.

Second Embodiment

As described above, when there is an update in the storage system 200A, the update content is registered in a journal, the journal manages the update content in order of update time, and the journal is transferred from the storage system 200A to the storage system 200B. The storage system 200B reproduces the received journal in the storage system 200B in the order of the update time. This is because, in the write request, data may be different if the process is not performed in the order of request time.

For example, if a write request is made twice to the same address of the same volume and a write request is made in the order of data X and data Y, the data X written first is overwritten, and the data Y requested to be written last is finally stored. However, if the write process is executed after changing the order, the data Y is overwritten, and the data X is finally stored.

As described above, in the write process, it is important to perform the process in accordance with the processing order, and if the processing order is not observed, the data of the primary site cannot be reproduced on the secondary site side. It is necessary to journalize write requests and manage the update order.

On the other hand, in the volume operation of the QoS setting for the volume, the result does not change even if the execution order is different from other process such as a write request, so that the execution order has no influence. Furthermore, it is not necessary to observe the execution order, and if a volume operation is performed at the primary site, a volume operation instruction may be immediately issued to the secondary site. Therefore, it is not necessary to manage with a journal.

By issuing an instruction to the secondary site immediately after a request is received at the primary site, reproduction can be performed at the secondary site earlier than a case where the reproduction is performed at the secondary site via the journal. It is more likely that the volume operation can be taken over to the secondary site even if a failure occurs.

Figure 12:
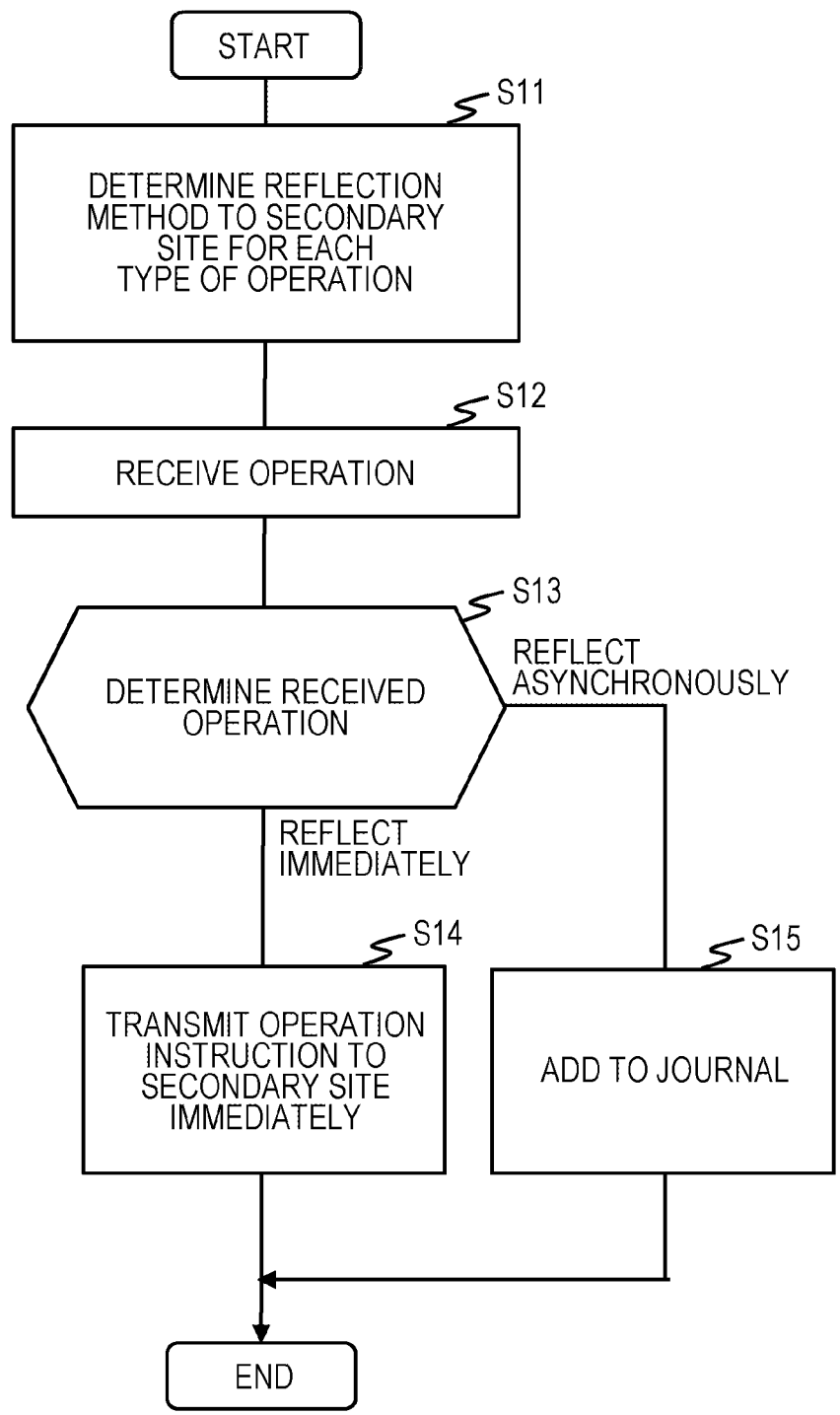
FIG. 12 is a flowchart illustrating an example of a reflection method selection process in the remote copy system according to a second embodiment.

FIG. 12 is a flowchart illustrating an example of a reflection method selection process in the remote copy system according to a second embodiment.

With reference to FIG. 12, a description will be given about a method of this embodiment of selecting whether to journalize by operation or transfer the operation to the secondary site without journalizing.

The operation reflection method table 425 of FIG. 8 is created for determining the operation to be managed by the journal among the operations (including the write request) received at the primary site (S11). The table may be created at the time of initial setting of the remote copy system 1.

First, all process requests for volumes received by the primary site are registered in the operation type 501. The operation includes write requests, QoS settings, and snapshots. The request source that can instruct each operation to the storage system 200 is registered in the executor 502. The executor is the AP 202 of the server system 201 or a storage administrator. If there are multiple executors for the same operation, the entry is separated to be registered. For the combination of the operation and the executor, it is determined whether or not the execution order of the operation should be guaranteed, and a method of reproducing the operation at the secondary site is registered.

The method of creating the operation reflection method table 425 may be manually input by, for example, a system administrator or a user. A tool for supporting input may be provided. The determination may be made based on the results of performing operations in the past to automatically create the table. A method of extracting information such as a manual using AI to automatically create the table may be used.

When an operation is received from the server system 201 (S12), the secondary site reproduction method 503 of the received operation type 501 is determined with reference to the operation reflection method table 425 (S13). If the secondary site reproduction method 503 is the method 1, journalizing is performed (S15). If the secondary site reproduction method 503 is the method 2, the operation instruction is sent to the secondary site without journalizing (S14).

According to this embodiment configured as described above, when an operation is received from the server system 201, based on the operation, any of the work of storing the update content by the operation in the journal volume 160 or the work of executing the operation after the operation is received is executed.

Therefore, according to this embodiment, when a failure occurs at the primary site, it is possible to quickly and reliably reproduce the operation environment at the secondary site.

For example, the above-described embodiments have been described in detail for easy understanding of the present invention and are not necessarily limited to those having all the described configurations. Further, it is possible to add, delete, and replace other configurations for a part of the configuration of each embodiment.

Each of the above-described configurations, functions, processing parts, processing means, and the like may be realized by hardware by designing a part or all of them with, for example, an integrated circuit. In addition, the present invention can also be realized by software program codes that implement the functions of the embodiments. In this case, a storage medium in which the program code is recorded is provided to the computer, and a processor included in the computer reads the program code stored in the storage medium. In this case, the program code itself read from the storage medium realizes the functions of the above-described embodiments, and the program code itself and the storage medium storing the program code configure the present invention. As a storage medium for supplying such a program code, for example, a flexible disk, CD-ROM, DVD-ROM, hard disk, solid state drive (SSD), optical disk, magneto-optical disk, CD-R, magnetic tape, nonvolatile memory cards, ROMs, and the like are used.

The program code for realizing the functions described in this embodiment can be implemented by a wide range of programs or script languages such as assembler, C/C++, perl, Shell, PHP, Java (registered trademark).

In the above-described embodiments, the control lines and information lines indicate what is considered necessary for the explanation, and not all control lines and information lines on the product are necessarily shown. All the components may be connected to each other.

What is claimed is:

1. A remote copy system comprising:
a primary site including a first server system and a first storage system connected to the first server system; and
a secondary site including a second server system and a second storage system connected to the second server system, wherein
the first server system and the second server system are clustered,
a virtual storage system is configured by the first storage system and the second storage system,
an asynchronous remote copy is performed with the first storage system as a copy source and the second storage system as a copy destination,
the first and second storage systems are configured to detect a failure of the second or first storage system that is a destination of the asynchronous remote copy,
the first storage system includes a data volume, a journal volume, and a storage controller, and
when an operation is received from the first server system, based on the operation, the storage controller executes any of a work of storing update content by the operation in the journal volume or a work of executing the operation after the operation is received; wherein the storage controller reflects the update content stored in the journal volume on the second server system after a failover occurs at the primary site and determines which work is executed based on a type of the operation.

2. The remote copy system according to claim 1, wherein the storage controller selects a method of reflecting the update content stored in the journal volume on the second server system based on the type of the operation.

3. The remote copy system according to claim 1, wherein the storage controller selects a method of reflecting the update content stored in the journal volume in the second server system based on a request source of the operation.

4. The remote copy system according to claim 3, wherein the storage controller has a table which describes a correspondence among the type of the operation, the request source of the operation, and a reflection method of the update content and selects the reflection method of the update content based on contents of the table.

5. The remote copy system according to claim 1, wherein when the operation is received from the first server system, the storage controller necessarily executes a work of storing the update content by the operation in the journal volume.

6. A remote copy system comprising:
a primary site including a first server system and a first storage system connected to the first server system; and
a secondary site including a second server system and a second storage system connected to the second server system, wherein
the first server system and the second server system are clustered,
a virtual storage system is configured by the first storage system and the second storage system,
an asynchronous remote copy is performed with the first storage system as a copy source and the second storage system as a copy destination,
the first and second storage systems are configured to detect a failure of the second or first storage system that is a destination of the asynchronous remote copy,
the first storage system includes a data volume, a journal volume, and a storage controller, and
when an operation is received from the first server system, based on the operation, the storage controller executes any of a work of storing update content by the operation in the journal volume or a work of executing the operation after the operation is received,
wherein the storage controller reflects the update content stored in the journal volume on the second server system after a failover occurs at the primary site and determines which work is executed based on a type of the operation.

* * * * *